No. 694,975. Patented Mar. 11, 1902.
E. C. S. MARSHALL.
SHUTTER HOLDER.
(Application filed Mar. 1, 1901.)

(No Model.)

WITNESSES
INVENTOR
Elizabeth C. S. Marshall

UNITED STATES PATENT OFFICE.

ELIZABETH C. S. MARSHALL, OF PHILADELPHIA, PENNSYLVANIA.

SHUTTER-HOLDER.

SPECIFICATION forming part of Letters Patent No. 694,975, dated March 11, 1902.

Application filed March 1, 1901. Serial No. 49,504. (No model.)

*To all whom it may concern:*

Be it known that I, ELIZABETH C. S. MARSHALL, a citizen of the United States, and a resident of the city and county of Philadelphia and State of Pennsylvania, have invented a new and useful Improvement in Shutter-Holders, of which the following is a full, clear, and sufficient specification, reference being had to the drawings annexed.

My invented device has reference to that class of shutter-holders in which fastener or holder spans the distance between the shutters.

The object of my invention is to keep the shutters a constant distance apart and obtain therefrom a fixed angle of bowing.

Figure 1:
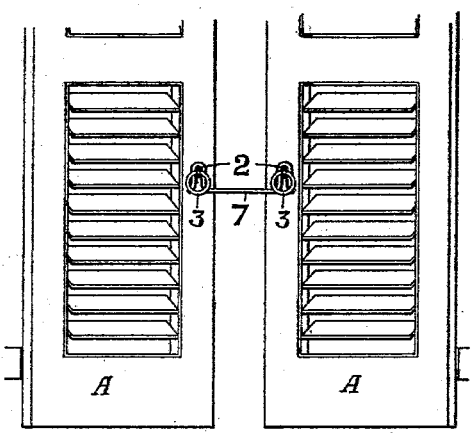
Figure 2:
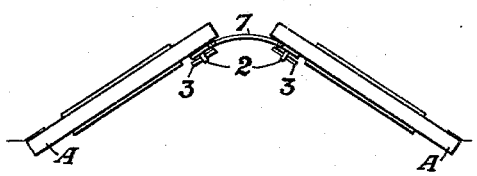
Figure 3:
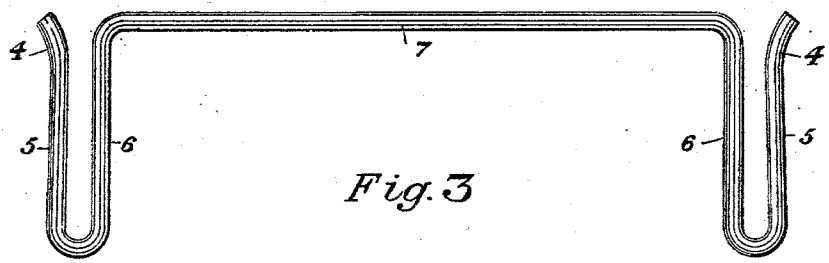
Figure 4:
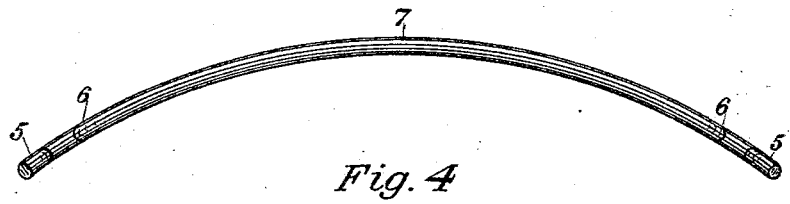

Figure 1 is a view of a pair of shutters provided with my invented device. Fig. 2 is a similar view looking downward upon the shutters and the fastener or holder. Fig. 3 is a side view of the holder, full size, turned upside down for convenience in drafting. Fig. 4 is a view of the same looking at Fig. 3 from above.

The shutters A A are provided with a pair of rings 3 3, held to the shutters by means of the staples 2 2. These rings are used to pull the shutters together and are very convenient, as shown in Figs. 1 and 2; but I do not limit myself to them. In my invention I make use of the space created between the rings and shutters to insert the tines of the removable portion of the holder.

The removable portion of the holder consists of tines fitting into the spaces above mentioned and a link 7, rigidly connected to these tines, which extends outwardly into the path of movement of the shutters and forms a stop against which the inside of the shutter will strike upon any impulse being given it to move inward. As the two shutters are held a fixed distance apart by the holder, this will prevent any disturbance in the angle of the bowing. In practice I make this link bow-shaped, as shown in Figs. 2 and 4. The tines fitting into the spaces created by the staples 2 2 preferably form one of the two tines of a hook, the tines being designated by 5 5 and that forming together with it the hook by 6 6, and by connecting the link 7 to the lower end of the tines 6 6 the removable portion of the holder is less likely to be shaken out of position. The two tines 5 and 6 are bent toward each other at their lower portions, and the extreme lower portion of the tines 5 5 spread a little, as shown at Fig. 4, to make it easier to insert it into the spaces provided by the staples 2 2, so that when the tines are inserted the outwardly-spread portion 4 4 of tines 5 5 will make the insertion very easy, while the bending together of the two tines 5 and 6 will form an additional security against their being shaken off, especially when the shutters are blown either inwardly or outwardly.

Having now described my invention, what I claim, and desire to secure by Letters Patent, is—

The combination in a shutter-holder, of a pair of staples and rings with a removable fastener consisting of a bow-shaped wire with hooks or tines upon each end.

In witness whereof I have hereunto set my hand.

ELIZABETH C. S. MARSHALL.

Witnesses:
 E. E. BERTHOUD,
 A. LOWRIE.